United States Patent
Sasaki et al.

(10) Patent No.: US 10,604,335 B2
(45) Date of Patent: Mar. 31, 2020

(54) METHOD FOR STORING MOLDING AND RETAINING MEMBER

(71) Applicant: TOKAI KOGYO CO., LTD., Obu-shi, Aichi (JP)

(72) Inventors: Takuya Sasaki, Obu (JP); Satoshi Enomoto, Obu (JP)

(73) Assignee: TOKAI KOGYO CO., LTD., Obu-shi (JP)

( * ) Notice: Subject to any disclaimer, the term of this patent is extended or adjusted under 35 U.S.C. 154(b) by 77 days.

(21) Appl. No.: 15/759,500

(22) PCT Filed: Apr. 15, 2016

(86) PCT No.: PCT/JP2016/062136
§ 371 (c)(1),
(2) Date: Mar. 12, 2018

(87) PCT Pub. No.: WO2017/047144
PCT Pub. Date: Mar. 23, 2017

(65) Prior Publication Data
US 2018/0257851 A1    Sep. 13, 2018

(30) Foreign Application Priority Data
Sep. 14, 2015  (JP) .................. 2015-180947

(51) Int. Cl.
*B65D 85/68* (2006.01)
*B60J 10/75* (2016.01)
(Continued)

(52) U.S. Cl.
CPC .............. *B65D 85/68* (2013.01); *B60J 10/74* (2016.02); *B60J 10/75* (2016.02); *B60R 13/0243* (2013.01); *B65D 2585/6882* (2013.01)

(58) Field of Classification Search
CPC .. B65D 85/68; B65D 2585/6885; B60J 10/76; B60J 10/74; B60J 10/75; B60R 13/0243
(Continued)

(56) References Cited

U.S. PATENT DOCUMENTS 5,178,279 A * 1/1993 Carroll ................. B65D 5/5088
206/335
5,702,148 A * 12/1997 Vaughan ................ B60J 10/235
296/146.9
(Continued)

FOREIGN PATENT DOCUMENTS

JP    H08-058874 A    3/1996
JP    H08-156990 A    6/1996
(Continued)

OTHER PUBLICATIONS

Oct. 26, 2018 Office Action issued in Japanese Patent Application No. 2015-180947.
(Continued)

*Primary Examiner* — Steven A. Reynolds
(74) *Attorney, Agent, or Firm* — Oliff PLC

(57) ABSTRACT

An inner molding is stored by retaining at least a curved portion of the inner molding by a retaining member in a state where a shape of at least the curved portion of the inner molding is maintained. The inner molding is retained by fitting at least a curved portion of an attachment portion of the inner molding into an attachment portion groove of the retaining member so that an outer surface of a first horizontal wall of the attachment portion abuts against a first inner wall surface of the attachment portion groove and an outer surface of a second horizontal wall of the attachment portion abuts against a second inner wall surface of the attachment portion groove.

8 Claims, 7 Drawing Sheets

B-B SECTIONAL VIEW

(51) Int. Cl.
*B60J 10/74* (2016.01)
*B60R 13/02* (2006.01)

(58) Field of Classification Search
USPC .................. 206/448; 296/146.2; 49/440
See application file for complete search history.

(56) References Cited

U.S. PATENT DOCUMENTS

| | | | |
|---|---|---|---|
| 6,779,661 B1* | 8/2004 | Kotlarski | B60S 1/3879 |
| | | | 206/335 |
| 7,870,958 B1 | 1/2011 | Gross et al. | |
| 10,118,756 B2* | 11/2018 | Clamagirand | B60S 1/3808 |
| 2004/0094989 A1 | 5/2004 | Matsumoto et al. | |
| 2007/0235362 A1* | 10/2007 | Lewis | B65D 43/162 |
| | | | 206/470 |
| 2013/0180073 A1* | 7/2013 | Boland | B65D 85/00 |
| | | | 15/250.32 |
| 2013/0327665 A1* | 12/2013 | Jehannet | B65D 85/54 |
| | | | 206/372 |
| 2014/0238886 A1* | 8/2014 | Jehannet | B60S 1/3879 |
| | | | 206/461 |

FOREIGN PATENT DOCUMENTS

| | | |
|---|---|---|
| JP | H10-000941 A | 1/1998 |
| JP | 2004-001835 A | 1/2004 |
| JP | 2004-074830 A | 3/2004 |
| JP | 2010-126065 A | 6/2010 |
| JP | 2013-103521 A | 5/2013 |
| JP | 2015-140067 A | 8/2015 |

OTHER PUBLICATIONS

Jul. 5, 2016 International Search Report issued in International Patent Application No. PCT/JP2016/062136.

Jul. 5, 2016 Written Opinion issued in International Patent Application No. PCT/JP2016/062136.

* cited by examiner

A-A SECTIONAL VIEW

B-B SECTIONAL VIEW

C-C SECTIONAL VIEW

D-D SECTIONAL VIEW

METHOD FOR STORING MOLDING AND RETAINING MEMBER

TECHNICAL FIELD

The present invention relates to a method for storing a molding to be attached to a vehicle and a retaining member used to store the molding.

BACKGROUND ART

As moldings to be attached to a vehicle, for example, an outer belt molding, which is attached along an upper edge of a door outer panel of a door of an automobile, an inner belt molding, which is attached along an upper edge of a door inner panel of a door of an automobile, and the like are known. For such moldings, during manufacturing of the moldings, a curving processing of curving the moldings to conform to a shape of a portion of a vehicle to which the moldings are to be attached (e.g., an upper edge of a door panel) is generally performed thereon, for example, as described in Patent Document 1 (JP-A-2013-103521).

CITATION LIST

Patent Document

Patent Document 1: JP-A-2013-103521

SUMMARY OF INVENTION

Technical Problem

However, moldings for vehicles are generally formed of a thermoplastic resin or the like. Therefore, in a case where a metal core material is not embedded in the moldings, even if a curving processing is performed, there are cases where a shape of a curved portion (portion curved by the curving processing) cannot be maintained. In particular, during storage of the moldings before being attached to a vehicle, such as during transportation thereof, if the moldings are exposed to a high temperature state, there is a possibility that the shape of the curved portion of the moldings could be changed by heat and thus returned to a linear shape. Therefore, there is a possibility that the shape of the moldings could not conform to a shape of a portion of a vehicle, to which the moldings are to be attached, so that the moldings cannot be attached to the portion of the vehicle.

Accordingly, an object of the present invention is to prevent a shape of a curved portion of a molding from being changed during storage of the molding.

Means for Solving the Problems

In order to solve the above object, the invention according to a first aspect is directed to a method for storing a molding which is applied to an elongated molding made of a thermoplastic polymer material and configured to be attached to a vehicle, the molding being configured such that a main body portion, which includes a pair of lateral walls facing each other and a top wall connecting the lateral walls, and an attachment portion, which protrudes from an outer surface of one lateral wall of the main body portion, are provided to extend in a longitudinal direction thereof, and the molding being configured such that at least a longitudinal end portion thereof has a shape curved in a vertical direction in a state where the molding is attached to the vehicle, wherein a retaining member having an attachment portion groove into which at least the curved portion of the attachment portion is configured to be fitted is used, the method including: storing the molding by retaining at least the curved portion of the molding by the retaining member in a state where a shape of at least the curved portion of the molding is maintained, the molding being retained by fitting at least the curved portion of the attachment portion into the attachment portion groove of the retaining member so that a first lateral surface of the attachment portion extending in the longitudinal direction abuts against one inner wall surface of the attachment portion groove and a second lateral surface of the attachment portion extending in the longitudinal direction abuts against another inner wall surface of the attachment portion groove.

According to this method, since the molding can be stored by retaining the molding by the retaining member in a state where the shape of the curved portion of the molding is maintained, it is possible to prevent the shape of the curved portion of the molding from being changed even if the molding is exposed to a high temperature state during storage of the molding.

In this case, it is preferable that the retaining member is provided with an abutting portion on which an end surface of the curved portion of the molding is configured to abut, and a pressing portion protruding from the abutting portion and configured to restrict an end portion of the curved portion of the molding from moving in a direction away from the retaining member. In this manner, since the end portion of the curved portion of the molding is restricted from moving in a direction away from the retaining member by the pressing portion, it is possible to prevent the molding from being removed from the retaining member. Also, in a case of removing the molding from the retaining member, the molding can be easily removed from the retaining member without applying too much force by lifting a portion of the molding, which is away from the end surface thereof, with the vicinity of the end surface of the molding which is pressed by the pressing portion serving as a fulcrum.

Also, it is preferable that the retaining member has a hole or a recess formed in at least an end portion of a bottom surface of the attachment portion groove. In this manner, when the molding is removed from the retaining member by lifting the portion of the molding, which is away from the end surface thereof, it is possible to avoid the vicinity of the end surface of the molding from abutting against the attachment portion groove, thereby facilitating lifting of the molding.

Further, it is preferable that the retaining member is formed of a thermoplastic polymer material having a larger Young's modulus and a higher heat distortion temperature than those of the main body portion and the attachment portion of the molding. In this manner, since the retaining member has a rigidity higher than the molding and also can withstand a higher temperature as compared with the molding, the shape of the curved portion of the molding can be reliably maintained by the retaining member even if the retaining member and the molding are exposed to a high temperature state, thereby reliably preventing a change in the shape of the curved portion of the molding.

Further, it is preferable that a predetermined location of the curved portion of the molding is not provided with the attachment portion, and the retaining member is configured such that a location of the attachment portion groove corresponding to the predetermined location is provided with a rib. In this manner, even in a case where a molding (i.e., a defective molding), in which the attachment portion is provided at the predetermined location by mistake, is attempted to be retained by the retaining member, since the attachment portion abuts against the rib, the molding cannot be retained by the retaining member. As a result, it is possible to prevent beforehand the molding, which is a defective product, from being retained by the retaining member.

Further, it is preferable that the attachment portion is provided with a first horizontal wall having the first lateral surface and a second horizontal wall having the second lateral surface, and the retaining member is provided with a projection portion arranged on at least a part of the attachment portion groove in the longitudinal direction thereof and configured to be arranged between the first horizontal wall and the second horizontal wall of the attachment portion. In this manner, when the molding is slid in the longitudinal direction of the retaining member to be retained by the retaining member, the molding can be smoothly guided to a predetermined retaining position by the projection portion located between the first horizontal wall and the second horizontal wall of the attachment portion.

Further, it is preferable that the molding is stored by housing the molding in a box on which the retaining member is mounted. In this manner, the molding can be stored by being retained inside the box.

Further, the invention according to a second aspect is directed to a retaining member which is applied to an elongated molding made of a thermoplastic polymer material and configured to be attached to a vehicle, the retaining member being used when storing the molding, the molding being configured such that a main body portion, which includes a pair of lateral walls facing each other and a top wall connecting the lateral walls, and an attachment portion, which protrudes from an outer surface of one lateral wall of the main body portion, are provided to extend in a longitudinal direction thereof, and the molding being configured such that at least a longitudinal end portion thereof has a shape curved in a vertical direction in a state where the molding is attached to the vehicle, wherein the retaining member includes an attachment portion groove into which at least the curved portion of the attachment portion is configured to be fitted, and the attachment portion groove includes one inner wall surface configured to abut against a first lateral surface of the attachment portion extending in the longitudinal direction and another inner wall surface configured to abut against a second lateral surface of the attachment portion extending in the longitudinal direction when the attachment portion of the molding is fitted into the attachment portion groove. By storing the molding by retaining the molding by using the retaining member of the above configuration, the same effects as those of the first aspect can be obtained.

DESCRIPTION OF EMBODIMENTS

Hereinafter, embodiments embodying a mode for implementing the present invention will be described.

Figure 1:
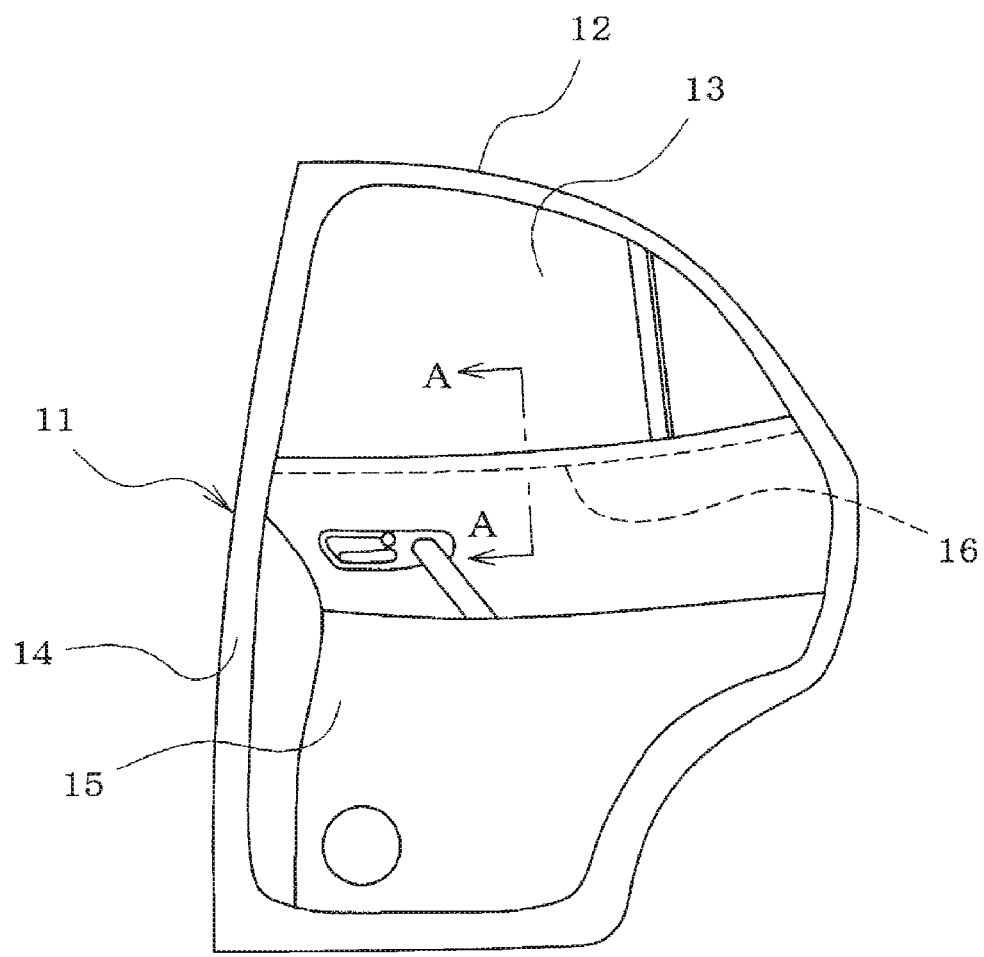
FIG. 1 is a view showing a schematic configuration of a door of an automobile according to one embodiment of the present invention.

As shown in FIG. 1, a rear door 11 of an automobile is integrally provided with a window frame 12, and also a window plate 13 (window glass) for opening and closing an window opening defined by the window frame 12 is provided thereto to be capable of moving up and down.

Also, a door trim 15 is attached on an interior side of an door inner panel 14 of the door 11, and upper edges of the door inner panel 14 and the door trim 15 (portions corresponding to a lower edge portion of the window opening edge) are formed such that rear end portions thereof have a shape curved in a vertical direction (in the present embodiment, a shape curved to be concave upward) to conform to a design of the vehicle.

Also, an elongated inner molding 16 (molding) is attached along the upper edge of the door inner panel 14, and thus a portion between the window plate 13 and the door trim 15 is covered with the inner molding 16.

Figure 2:
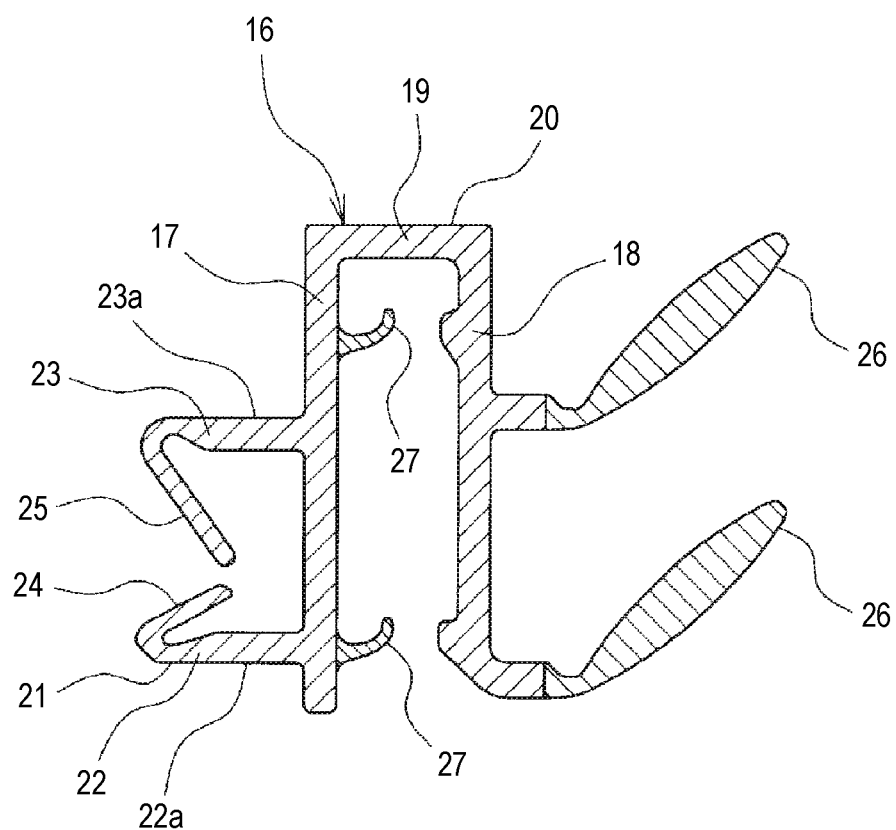
FIG. 2 is a sectional view taken along line A-A in FIG. 1.

As shown in FIG. 2, the inner molding 16 is formed by extrusion-molding a thermoplastic polymer material, in such a manner that a main body portion 20, which includes a pair of interior lateral wall 17 and exterior lateral wall 18 facing each other and a top wall 19 connecting both lateral walls 17, 18, and an attachment portion 21, which protrudes from an outer surface of the interior lateral wall 17 of the main body portion 20, are integrally provided to extend in a longitudinal direction.

The attachment portion 21 is provided with a first horizontal wall 22 and a second horizontal wall 23 protruding from the outer surface of the interior lateral wall 17 to face each other, and the second horizontal wall 23 is arranged further toward a base end side (top wall 19 side) of the interior lateral wall 17 as compared with the first horizontal wall 22. A distal end portion of the first horizontal wall 22 is provided with a folded-back portion 24 extending toward a base end side of the second horizontal wall 23, and a distal end portion of the second horizontal wall 23 is provided with a folded-back portion 25 extending toward a base end side of the first horizontal wall 22.

The first horizontal wall 22 and the second horizontal wall 23 of the attachment portion 21 are formed such that an outer surface 22a of the first horizontal wall 22 and an outer surface 23a of the second horizontal wall 23 are parallel to each other and extend in a longitudinal direction of the attachment portion 21 (i.e., a longitudinal direction of the inner molding 16). In the present embodiment, the outer surface 22a of the first horizontal wall 22 corresponds to a first lateral surface as mentioned in the claims, and the outer surface 23a of the second horizontal wall 23 corresponds to a second lateral surface as mentioned in the claims.

When the inner molding 16 is attached along the upper edge of the door inner panel 14, the door inner panel 14 is gripped between the interior lateral wall 17 and the exterior lateral wall 18 of the main body portion 20. Also, the door trim 15 is gripped between the first horizontal wall 22 and the second horizontal wall 23 of the attachment portion 21.

Also, on an outer surface of the exterior lateral wall 18 of the main body portion 20, a plurality of exterior lips 26 are integrally provided to protrude toward the exterior side (window plate 13 side). Further, on an inner surface of the interior lateral wall 17 of the main body portion 20, a plurality of holding lips 27 are integrally provided to protrude toward the exterior lateral wall 18.

The main body portion 20 and the attachment portion 21 of the inner molding 16 are formed by, for example, PP resin (polypropylene resin) having a Rockwell hardness of 90. Meanwhile, the thermoplastic polymer material used to mold the main body portion 20 and the attachment portion 21 is not limited to PP resin, but for example, TPO (olefin-based thermoplastic elastomer), SBC (styrene-based thermoplastic elastomer), PVC resin (polyvinyl chloride resin) or the like may be used.

The lips 26, 27 (exterior lips 26 and holding lips 27) of the inner molding 16 are molded by a thermoplastic polymer material having a hardness smaller than that of the main body portion 20 and the attachment portion 21 and, for example, are molded by TPO having a JIS K 7215 durometer hardness of HDA 70. Meanwhile, the thermoplastic polymer material used to mold the lips 26, 27 is not limited to TPO, but for example, SBC, PVC resin or the like may be used.

The inner molding 16 is molded in a linear shape by extrusion molding, and then a curving processing for curving the inner molding 16 to conform to the shape of the upper edges of the door inner panel 14 and the door trim 15 is performed thereto. Specifically, a longitudinal rear end portion of the extrusion-molded product molded in a linear shape is partially heated and softened and then is cooled and solidified in a state of being fitted and curved in a mold having a predetermined curved shape. Thus, the inner molding 16 is configured such that the longitudinal rear end portion thereof has a shape curved in the vertical direction in a state where the inner molding 16 is attached to the vehicle (in the present embodiment, a shape curved to be concave upward).

Also, on a rear end portion of the door 11, the door trim 15 is set to be close to the inner molding 16 (i.e., a distance between the door trim 15 and the inner molding 16 is narrower than in other portions). Accordingly, in order to prevent the attachment portion 21 of the inner molding 16 from abutting against the door trim 15, the attachment portion 21 is cut out at a predetermined location of the curved portion at the rear end portion of the inner molding 16 (e.g., at a region within a predetermined range from an end surface thereof). Thus, the predetermined location of the curved portion of the inner molding 16 is not provided with the attachment portion 21.

However, during storage of the inner molding 16 before being attached to a vehicle, such as during transportation thereof, if the inner molding 16 is exposed to a high temperature state without being retained, there is a possibility that the curved portion of the inner molding 16 could be softened by heat and thus returned to a linear shape.

Therefore, according to the present embodiment, the inner molding 16 is stored in a state where the curved portion of the inner molding 16 is retained by a retaining member 29 as described below.

Hereinafter, the retaining member 29 used to store the inner molding 16 will be described based on FIGS. 3 to 7.

Figure 3:
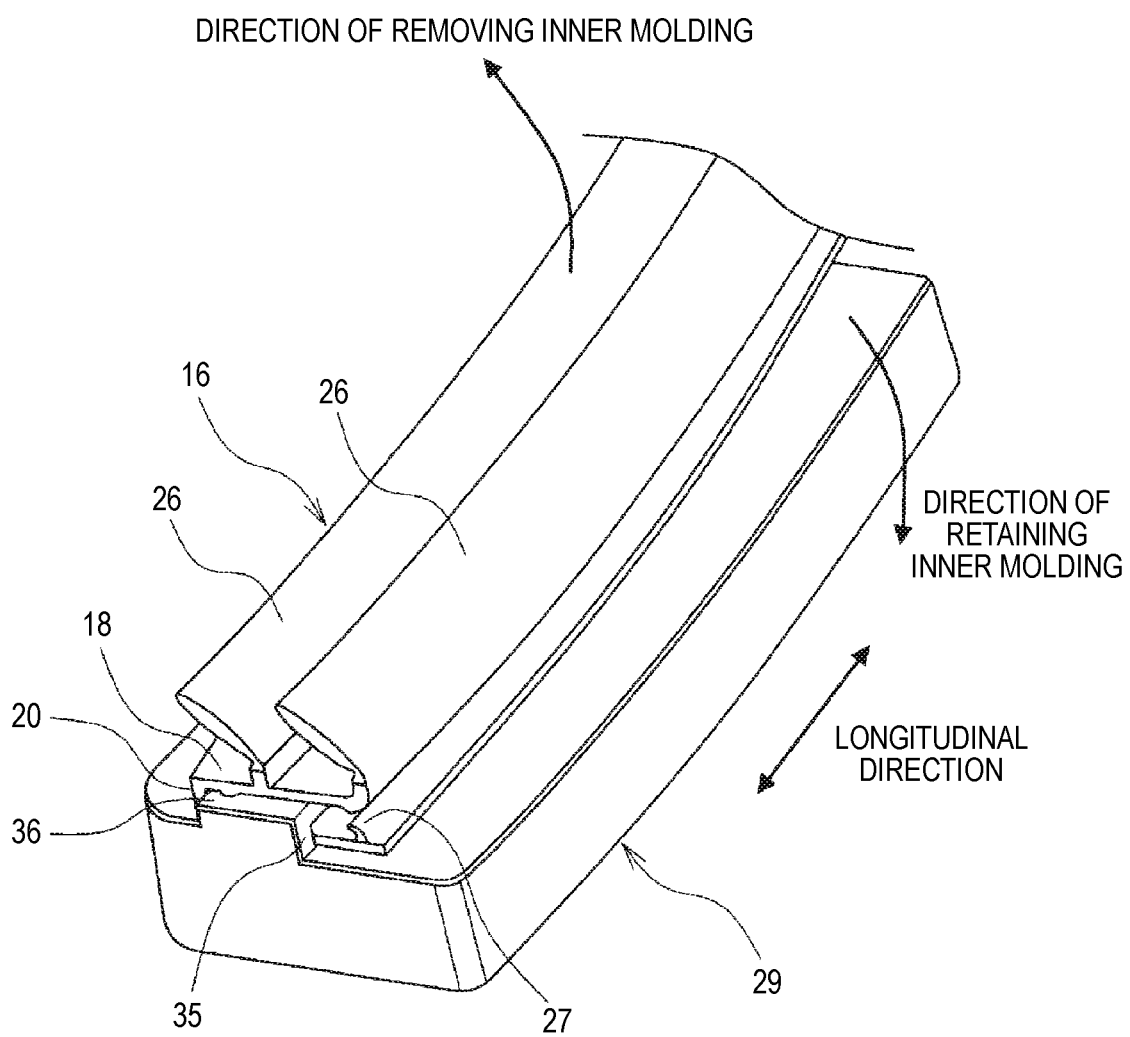
FIG. 3 is a perspective view showing a state where an inner molding is attached to a retaining member.
Figure 4:
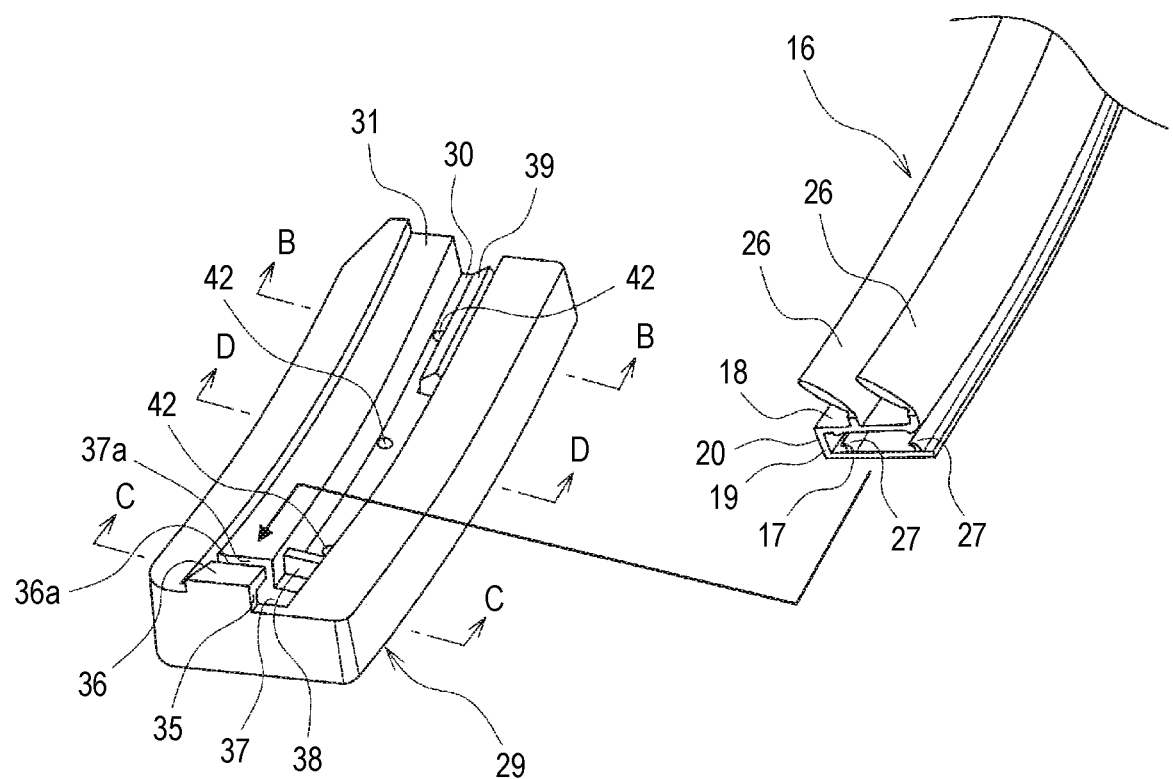
FIG. 4 is a perspective view showing a state before the inner molding is attached to the retaining member.
Figure 5:
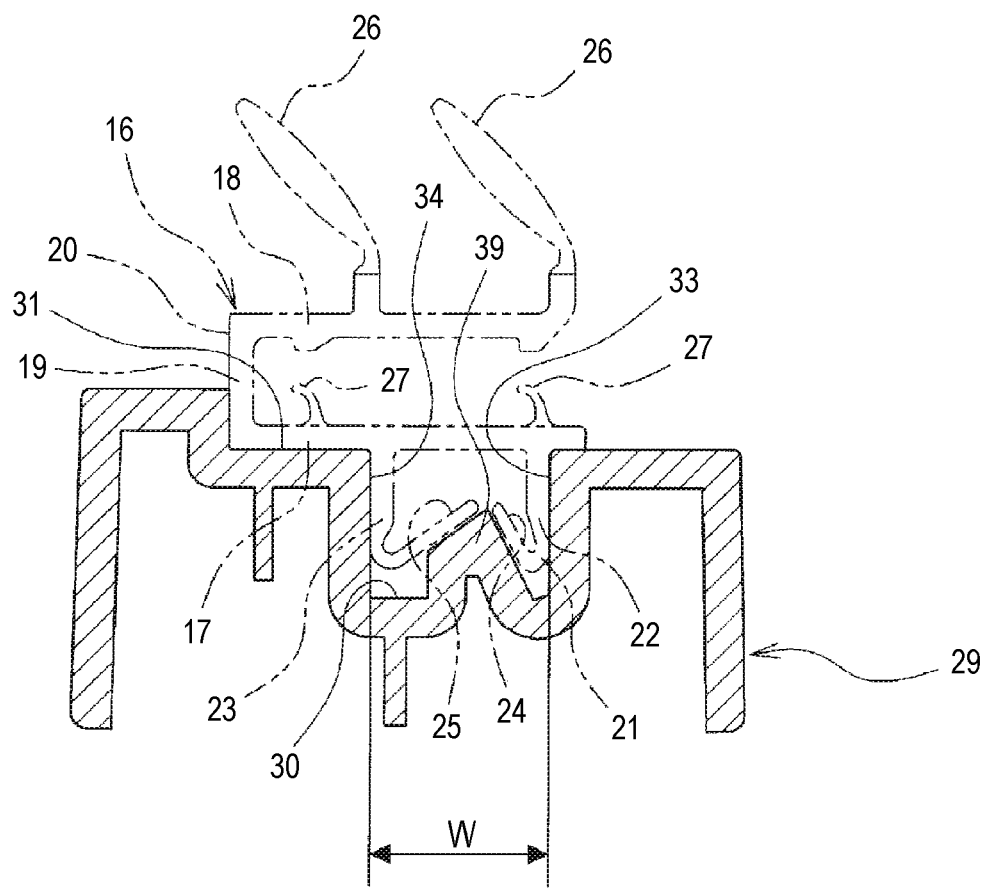
FIG. 5 is a sectional view taken along line B-B in FIG. 4.

As shown in FIGS. 3 to 5, the retaining member 29 is intended to retain at least the curved portion (rear end portion) of the inner molding 16 in the longitudinal direction thereof in a state where the inner molding 16 is arranged sideways (a state where the interior lateral wall 17 is oriented downward). The retaining member 29 may be configured to retain only the curved portion of the inner molding 16, but may be configured to retain the curved portion of the inner molding 16 and also the adjacent portion (linear portion) thereof. If the curved portion of the inner molding 16 and the adjacent portion thereof are retained, the inner molding 16 can be firmly retained.

The retaining member 29 is formed by injection molding or the like using a thermoplastic polymer material having a larger Young's modulus (modulus of longitudinal elasticity) and a higher heat distortion temperature than those of the main body portion 20 and the attachment portion 21 of the inner molding 16. The thermoplastic polymer material used to mold the retaining member 29 includes, for example, ABS resin (acrylonitrile butadiene styrene resin), POM (polyacetal) or the like.

The retaining member 29 is configured such that an attachment portion groove 30 into which at least a curved portion of the attachment portion 21 is fitted and an interior lateral wall groove 31 for holding at least a curved portion of the interior lateral wall 17 (portion thereof closer to the top wall 19 than to the attachment portion 21) are formed to extend in a longitudinal direction of the retaining member 29. The grooves 30, 31 are formed in a shape curved to conform to the shape of the curved portion of the inner molding 16.

As shown in FIG. 5, the attachment portion groove 30 is configured such that a first inner wall surface 33 on which the outer surface 22*a* of the first horizontal wall 22 (see FIG. 2) is configured to abut when the attachment portion 21 is fitted in the attachment portion groove 30, and a second inner wall surface 34 on which the outer surface 23*a* of the second horizontal wall 23 (see FIG. 2) is configured to abut when the attachment portion 21 is fitted in the attachment portion groove 30 are formed to face each other. A width dimension W of the attachment portion groove 30 (a dimension between the first inner wall surface 33 and the second inner wall surface 34) is set to have substantially the same dimension as a width dimension of the attachment portion 21 (a dimension between the outer surface 22*a* of the first horizontal wall 22 and the outer surface 23*a* of the second horizontal wall 23). Thus, when the attachment portion 21 of the inner molding 16 is fitted in the attachment portion groove 30 of the retaining member 29 and thus the inner molding 16 is retained by the retaining member 29, the attachment portion 21 is restricted from moving relative to the retaining member 29 in a width direction thereof and thus the inner molding 16 can be restricted from moving relative to the retaining member 29.

As shown in FIGS. 3 and 4, the retaining member 29 is provided with a plate-shaped abutting portion 35 on which an end surface of the curved portion of the inner molding 16 is configured to abut, and a plate-shaped pressing portion 36 configured to restrict an end portion of the curved portion of the inner molding 16 from moving in a direction away from the retaining member 29. The abutting portion 35 is provided to protrude upward from a longitudinal end portion of the retaining member 29. Also, the pressing portion 36 is provided to protrude from an upper end portion of the abutting portion 35 toward the inner molding 16.

Figure 6:
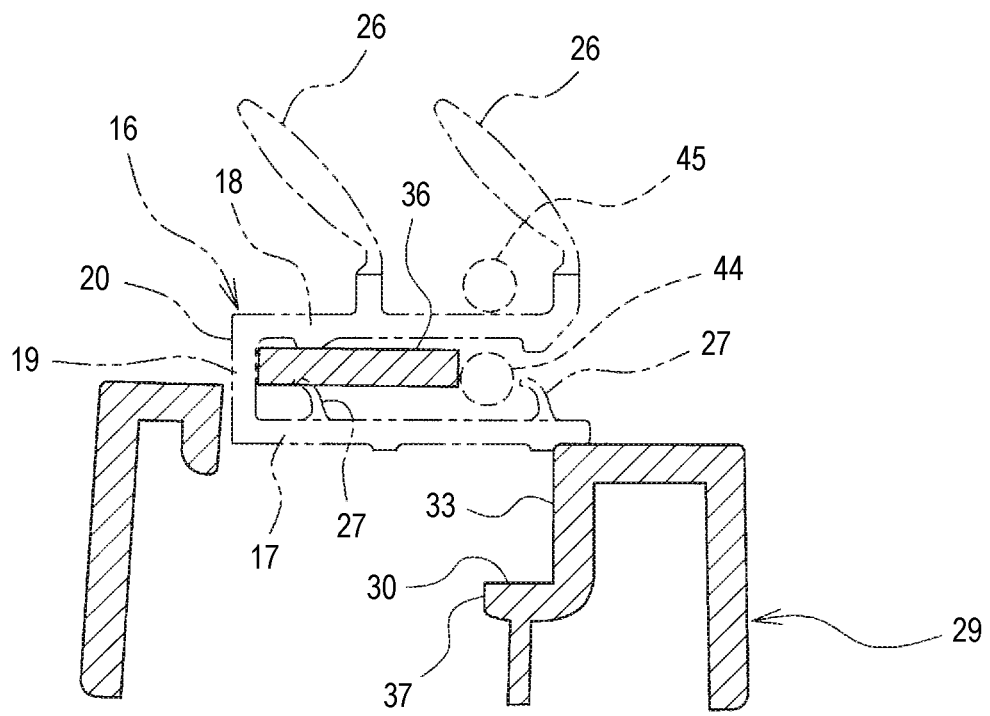
FIG. 6 is a sectional view taken along line C-C in FIG. 4.

As shown in FIG. 6, when the inner molding 16 is retained by the retaining member 29, the pressing portion 36 is arranged between the interior lateral wall 17 and the exterior lateral wall 18 of the main body portion 20 of the inner molding 16, thereby restricting the inner molding 16 from moving in the vertical direction. Also, in an end portion of a bottom surface of the attachment portion groove 30 (e.g., a portion thereof corresponding to below the pressing portion 36), a hole 37 is formed to extend therethrough in the vertical direction.

Further, as shown in FIG. 4, at a location of the attachment portion groove 30 corresponding to the predetermined location of the inner molding 16 (the portion thereof, in which the attachment portion 21 is not provided), a plate-shaped rib 38 is provided to protrude upward. Also, on at least a portion of the attachment portion groove 30 in a longitudinal direction thereof (e.g., an end portion thereof opposite to the abutting portion 35), a projection portion 39 is provided to be arranged between the first horizontal wall 22 and the second horizontal wall 23 of the attachment portion 21. As shown in FIG. 5, an upper portion of the projection portion 39 is formed in a generally triangular shape to conform to the shape of the folded-back portions 24, 25 of the attachment portion 21.

Figure 7:
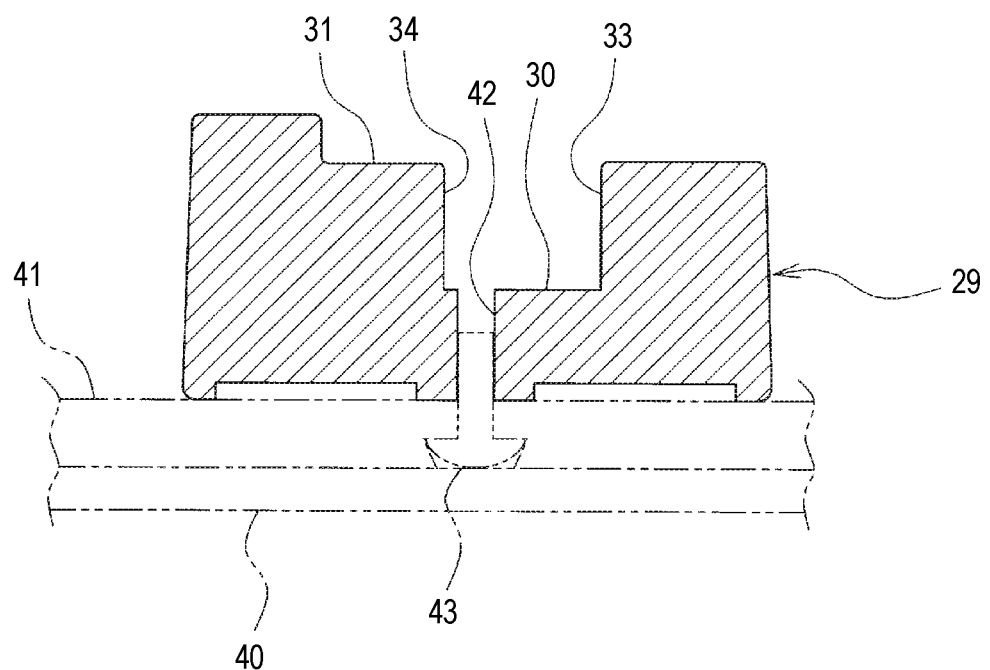
FIG. 7 is a sectional view taken along line D-D in FIG. 4.

As shown in FIG. 7, an insole 41 is laid on the bottom of a large box 40 for housing a plurality of inner moldings 16, and a plurality of retaining members 29 are mounted on the insole 41. A plurality of mounting holes 42 (see FIG. 4) are formed in a bottom surface of the attachment portion groove 30 of the retaining member 29. Also, screws 43 inserted through the insole 41 are screwed into the mounting holes 42 of the retaining member 29, thereby attaching the retaining member 29 to the insole 41.

As shown in FIGS. 3 and 4, in a case of retaining the inner molding 16 by the retaining member 29, the inner molding 16 is pushed in an inclined state into the retaining member 29 from in front of the abutting portion 35 of the retaining member 29, and then the inner molding 16 is slid in the longitudinal direction until the end surface of the inner molding 16 abuts against the abutting portion 35. After the end surface of the inner molding 16 abuts against the abutting portion 35, the inner molding 16 is pushed downward (in a retaining direction), thereby causing the inner molding 16 to be retained by the retaining member 29. At this time, at least the curved portion of the attachment portion 21 is fitted in the attachment portion groove 30, so that the outer surface 22a of the first horizontal wall 22 of the attachment portion 21 abuts against the first inner wall surface 33 of the attachment portion groove 30 and the outer surface 23a of the second horizontal wall 23 of the attachment portion 21 abuts against the second inner wall surface 34 of the attachment portion groove 30. By doing so, at least the curved portion of the inner molding 16 is retained by the retaining member 29 while maintaining the shape of at least the curved portion of the inner molding 16.

In this way, a plurality of inner moldings 16 can be respectively caused to be retained by a plurality of retaining members 29 mounted in the large box 40 so that the plurality of inner moldings 16 are housed in the box 40, thereby retaining and storing the plurality of inner moldings 16 in the box 40. Thus, when the inner moldings 16 are transported to a vehicle body assembling factory, it is possible to transport the plurality of inner moldings 16 while storing the inner moldings 16 together in one box 40.

Further, although there are cases where the inside of a vehicle or ship transporting the inner molding 16 becomes a high temperature of 40° C. or higher, the present embodiment makes it possible to store the inner molding 16 by retaining the inner molding 16 by the retaining member 29 in a state where the shape of the curved portion of the inner molding 16 is maintained. Therefore, even if the inner molding 16 is exposed to a high temperature state during storage of the inner molding 16, such as during transportation thereof, it is possible to prevent the shape of the curved portion of the inner molding 16 from being changed.

Also, according to the present embodiment, the retaining member 29 is formed of a thermoplastic polymer material having a larger Young's modulus and a higher heat distortion temperature than those of the main body portion 20 and the attachment portion 21 of the inner molding 16. In this manner, since the retaining member 29 has a rigidity higher than the inner molding 16 and also can withstand a higher temperature as compared with the inner molding 16, the shape of the curved portion of the inner molding 16 can be reliably maintained by the retaining member 29 even if the retaining member 29 and the inner molding 16 are exposed to a high temperature state, thereby reliably preventing a change in the shape of the curved portion of the inner molding 16.

Further, according to the present embodiment, the retaining member 29 is provided with the abutting portion 35 on which the end surface of the curved portion of the inner molding 16 is configured to abut, and the pressing portion 36 protruding from the abutting portion 35 and configured to restrict the end portion of the curved portion of the inner molding 16 from moving in a direction away from the retaining member 29. In this manner, since the end surface of the curved portion of the inner molding 16 is restricted from moving in a direction away from the retaining member 29 by the pressing portion 36, it is possible to prevent the inner molding 16 from being removed from the retaining member 29.

Further, according to the present embodiment, the rib 38 is provided at a location of the attachment portion groove 30 of the retaining member 29 which corresponds to the predetermined location of the inner molding 16 (the portion thereof, in which the attachment portion 21 is not provided). In this manner, even in a case where an inner molding 16 (i.e., a defective inner molding 16), in which the attachment portion 21 is provided at the predetermined location by mistake, is attempted to be retained the retaining member 29, since the attachment portion 21 abuts against the rib 38, the inner molding 16 cannot be retained to the retaining member 29. As a result, it is possible to prevent beforehand the inner molding 16, which is a defective product, from being retained by the retaining member 29.

Further, according to the present embodiment, at least a portion of the attachment portion groove 30 of the retaining member 29 in a longitudinal direction thereof is provided with the projection portion 39 configured to be arranged between the first horizontal wall 22 and the second horizontal wall 23 of the attachment portion 21. In this manner, when the inner molding 16 is slid in the longitudinal direction of the retaining member 29 to be retained by the retaining member 29, the inner molding 16 can be smoothly guided to a predetermined retaining position (a position where the end surface of the inner molding 16 abuts against the abutting portion 35) by the projection portion 39 located between the first horizontal wall 22 and the second horizontal wall 23 of the attachment portion 21.

Meanwhile, in a case of removing the inner molding 16 from the retaining member 29, a portion of the inner molding 16, which is not retained by the retaining member 29, is gripped and then lifted upward (in a removing direction). At this time, the vicinity of the end surface of the inner molding 16 is pressed by the pressing portion 36 and thus serves as a fulcrum. A portion of the inner molding 16, which is away from the end surface thereof, is lifted with the vicinity of the end surface which is pressed by the pressing portion 36 serving as the fulcrum. In this manner, even if the inner molding 16 is fitted in the attachment portion groove 30, the inner molding 16 can be easily removed from the retaining member 29 without applying too much force.

Further, according to the present embodiment, the hole 37 is formed in end portions (e.g., a portion corresponding to below the pressing portion 36) of bottom surfaces of the attachment portion groove 30 and the interior lateral wall groove 31 of the retaining member 29. In this manner, when the inner molding 16 is removed from the retaining member 29 by lifting the portion of the inner molding 16, which is away from the end surface thereof, it is possible to avoid the vicinity of the end surface of the inner molding 16 from abutting against the attachment portion groove 30 and the interior lateral wall groove 31, thereby facilitating lifting of the inner molding 16. Here, a portion 37a of an inner wall, which defines the hole 37, is located on a side of a longitudinal end portion of the retaining member 29, which is on an opposite side of the abutting portion 35, as compared with a distal end 36a of the pressing portion 36.

Meanwhile, in the present embodiment, although the hole 37 is formed in the bottom surfaces of the attachment portion groove 30 and the interior lateral wall groove 31 of the retaining member 29, the present invention is not limited thereto. A recess, which does not penetrate, may be formed. Alternatively, a configuration in which the hole or recess is formed only in the attachment portion groove 30, or a configuration in which no hole or recess is formed may be employed.

Also, in the present embodiment, although the plate-shaped pressing portion 36 is arranged between the interior lateral wall 17 and the exterior lateral wall 18 of the main body portion 20 of the inner molding 16, the present invention is not limited thereto. For example, as shown by a broken line in FIG. 6, a cylindrical pressing portion 44 may be arranged between the interior lateral wall 17 and the exterior lateral wall 18, or a cylindrical pressing portion 45 may be arranged above the exterior lateral wall 18.

Further, in the present embodiment, although the abutting portion 35 and the pressing portion 36 are provided to the retaining member 29, the present invention is not limited thereto. A configuration, in which the abutting portion 35 and the pressing portion 36 are not provided to the retaining member 29, may be employed.

Further, in the present embodiment, although the rib 38 and the projection portion 39 are provided to the retaining member 29, the present invention is not limited thereto. A configuration, in which the rib 38 and the projection portion 39 are not provided to the retaining member 29, may be employed.

Further, in the present embodiment, although the attachment portion 21 of the inner molding 16 is configured such that the first horizontal wall 22 and the second horizontal wall 23 are provided thereto, the present invention is not limited thereto. A configuration, in which only one horizontal wall is provided thereto, may be employed.

Further, in the present embodiment, although the longitudinal rear end portion of the inner molding 16 is formed in a shape curved to correspond to the shape of the upper edges of the door inner panel 14 and the door trim 15, the present invention is not limited thereto. A longitudinal front end portion of the inner molding 16 may be formed in a curved shape, or the inner molding may be formed in a curved shape over the entire longitudinal length thereof and thus the inner molding may be retained by the retaining member over the entire length thereof.

Further, in the present embodiment, although the present invention is applied to the inner molding to be attached along the upper edge of the door inner panel of the rear door, the present invention is not limited thereto, but may be applied to an outer molding to be attached along an upper edge of an door outer panel of the rear door. Also, the present invention is not limited to the rear door, but may be implemented to be applied to various moldings, in which at least a longitudinal end portion thereof has a curved shape, such as applying the invention to an inner molding or outer molding of other doors (e.g., a front door).

Further, although in the present embodiment, the retaining member is attached to the insole by the screws, the present invention is not limited thereto, but the retaining member may be attached to the insole using an adhesive or a double-sided adhesive tape.

In addition, in the present invention, various modifications, such as appropriately modifying shapes of the molding or the retaining member, can be made without departing from the spirit and scope thereof.

REFERENCE NUMERALS LIST

16 Inner molding (molding)
17 Interior lateral wall
18 Exterior lateral wall
19 Top wall
20 Main body portion
21 Attachment portion
22 First horizontal wall
22a Outer surface (first lateral surface)
23 Second horizontal wall
23a Outer surface (second lateral surface)
29 Retaining member
30 Attachment portion groove
33 First inner wall surface
34 Second inner wall surface
35 Abutting portion
36 Pressing portion
37 Hole
38 Rib
39 Projection portion
40 Box

The invention claimed is:

1. A method for storing an elongated molding made of a thermoplastic polymer material and configured to be attached to a vehicle, the molding being configured such that a main body portion, which includes a pair of lateral walls facing each other and a top wall connecting the lateral walls, and an attachment portion, which protrudes from an outer surface of one lateral wall of the main body portion, are provided to extend in a longitudinal direction thereof, and the molding having a curved portion at at least a longitudinal end portion thereof, the method comprising:
    storing the molding by retaining at least the curved portion of the molding in a retaining member in a state where a shape of at least the curved portion of the molding is maintained, the molding being retained by fitting the attachment portion of at least the curved portion of the molding into an attachment portion groove of the retaining member so that a first lateral surface of the attachment portion extending in the longitudinal direction abuts against one inner wall surface of the attachment portion groove and a second lateral surface of the attachment portion extending in the longitudinal direction abuts against another inner wall surface of the attachment portion groove,
    wherein the retaining member is formed of a thermoplastic polymer material having a larger Young's modulus and a higher heat distortion temperature than those of the main body portion and the attachment portion of the molding.

2. The method for storing the molding according to claim 1, wherein the retaining member is provided with an abutting portion on which an end surface of the curved portion of the molding is configured to abut, and a pressing portion protruding from the abutting portion and configured to restrict an end portion of the curved portion of the molding from moving in a direction away from the retaining member.

3. The method for storing the molding according to claim 1,
wherein the retaining member has a hole or a recess formed in at least an end portion of a bottom surface of the attachment portion groove.

4. The method for storing the molding according to claim 1,
wherein a predetermined location of the curved portion of the molding is not provided with the attachment portion, and
wherein the retaining member is configured such that a location of the attachment portion groove corresponding to the predetermined location is provided with a rib.

5. The method for storing the molding according to claim 1,
wherein the attachment portion is provided with a first horizontal wall having the first lateral surface and a second horizontal wall having the second lateral surface, and
wherein the retaining member is provided with a projection portion arranged on at least a part of the attachment portion groove in the longitudinal direction thereof and configured to be arranged between the first horizontal wall and the second horizontal wall of the attachment portion.

6. The method for storing the molding according to claim 1,
wherein the molding is stored by housing the molding in a box on which the retaining member is mounted.

7. A retaining member which is applied to an elongated molding made of a thermoplastic polymer material and configured to be attached to a vehicle, the retaining member being used when storing the molding, the molding being configured such that a main body portion, which includes a pair of lateral walls facing each other and a top wall connecting the lateral walls, and an attachment portion, which protrudes from an outer surface of one lateral wall of the main body portion, are provided to extend in a longitudinal direction thereof, and the molding having a curved portion at at least a longitudinal end portion thereof,
wherein the retaining member includes an attachment portion groove into which the attachment portion of at least the curved portion of the molding is configured to be fitted, and the attachment portion groove includes one inner wall surface configured to abut against a first lateral surface of the attachment portion extending in the longitudinal direction and another inner wall surface configured to abut against a second lateral surface of the attachment portion extending in the longitudinal direction when the attachment portion of the molding is fitted into the attachment portion groove, and
wherein the retaining member is formed of a thermoplastic polymer material having a larger Young's modulus and a higher heat distortion temperature than those of the main body portion and the attachment portion of the molding.

8. The retaining member according to claim 7,
wherein the retaining member is provided with an abutting portion on which an end surface of the curved portion of the molding is configured to abut; and a pressing portion protruding from the abutting portion and configured to restrict an end portion of the curved portion of the molding from moving in a direction away from the retaining member.

* * * * *